United States Patent [19]
Fincham

[11] Patent Number: 5,163,780
[45] Date of Patent: Nov. 17, 1992

[54] METHOD OF MODIFYING THE SOIL PERMEABILITY FOR SEPTIC SYSTEMS

[76] Inventor: James R. Fincham, 13915 Claridon Park Dr., Chardon, Ohio 44024

[21] Appl. No.: 682,655

[22] Filed: Apr. 9, 1991

[51] Int. Cl.⁵ .............................................. E02B 11/00
[52] U.S. Cl. ...................................... 405/36; 405/258
[58] Field of Search ................... 405/39, 43, 45, 174; 172/699, 21, 774, 1; 111/200, 78

[56] References Cited

U.S. PATENT DOCUMENTS

| | | | |
|---|---|---|---|
| 2,129,453 | 9/1938 | Van Sickle | 172/699 X |
| 2,439,743 | 4/1948 | McEwen | 172/699 X |
| 4,293,238 | 10/1981 | Kuzin et al. | 172/699 X |
| 4,548,276 | 10/1985 | Linger | 172/774 X |
| 4,655,639 | 4/1987 | Reece | 405/174 X |

OTHER PUBLICATIONS

Soil Microbiology, Martin Alexander, John Wiley & Sons, Inc. 1967, pp. 20-21, 24-25, 52-53, 124-125.
Ohio Report, D. M. Van Doren, Jr. & J. E. Henry, vol. 70, 1985 pp. 26-28.
Penn State, College of Agriculture, Cooperative Extension, Two Remedies for Failing Septic Systems, Extension Circular 302, 1988.
Paratill, The Tye Company, Form 1131, 1986.
Paratill, The Tye Company, Form 1147, 1988.
The Nature and Properties of Soils, Buckman H. and Brady N., MacMillan and Co., 166 pp. 54-55.
Soil Management for Conservation and Production, Cook R. L. Wiley and Sons Inc., 1986 p. 125.

*Primary Examiner*—Dennis L. Taylor
*Attorney, Agent, or Firm*—Watts, Hoffman, Fisher & Heinke Co.

[57] ABSTRACT

A method of restoring soil porosity and permeability to soils adjacent to home leach trench septic systems, increasing rates of aerobic decomposition of accumulated organic matter, breaking up and unplugging side walls of failed trenches, increasing leaching rates of waste liquids into surrounding soil. Soil is lifted from an 18″ depth by a tillage tool. Bulk density is decreased.

14 Claims, 2 Drawing Sheets

METHOD OF MODIFYING THE SOIL PERMEABILITY FOR SEPTIC SYSTEMS

DISCLOSURE OF THE INVENTION

This invention relates to a method of increasing soil porosity, permeability and soil aeration.

BACKGROUND OF THE INVENTION

Some household dwellings are provided with underground septic systems having a series of leach trenches utilized for the leaching of liquids into the soil. Soil in its natural state is porous and durable. Unfortunately, at times organic matter can pass into the leach trenches from the septic tanks. The porosity of soil allows oxygen from the atmosphere to penetrate the soil pores and to aid in the decomposition of organic matter.

For the last 30 to 40 years, the disposal of household septic effluent, "on-lot", has been an increasingly attractive and environmentally necessary practice. Previously, and even today, in some areas of high density, slowly permeable soils, septic effluent is discharged into a road ditch or surface water drainage-way with little or no treatment. An alternative approach is to utilize the top 18 to 24 inches of soil to absorb and filter the effluent while allowing the natural bacterial community within the soil to breakdown hazardous solid wastes. This alternative approach is both cost effective and environmentally sound. It results in a naturally filtered supply of water entering the subterranean aquifers.

The efficiency of the "on-lot" septic absorption trench can be limited by reduction of soil porosity or rates of permeability caused by the current method of septic trench installation.

The current method of septic trench or leach trench installation, also known as ET or Evapotranspiration trenches, involves the use of very heavy equipment mounted on rubber tires. Most areas where leach trench systems are used experience wet weather conditions during the installation. The combination of wet soils and heavy concentrated loads, causes the pore spaces through which water must move to escape the trenches, to collapse or be crushed. The soil compaction can be as deep as 16 to 18 inches.

As a backhoe bucket is drawn through the soil, pressure is exerted laterally through the soil, again crushing the pore spaces through which water must move to evacuate the trench. It also glazes the walls of the trench, so as to further close pores.

Compaction, i.e., collapsing of pore space in the soil, has the effect of slowing the movement of water through the soil. In septic leach trenches this has the additional effect of maintaining nearly flooded conditions in the trenches, thereby preventing the entry of oxygen into the soil pores. The soil environment becomes an anaerobic environment. The bacterial community in this anaerobic condition produces small quantities of alcohol and formaldehyde, when digesting organic matter. Alcohol and formaldehyde are natural preservatives and stop the digestive process of the organic matter and even tend to preserve it in the undigested state.

A failing septic system, one which is not properly maintained by pumping accumulated solids, experiences a large deposition of organic matter in this anaerobic condition, the organic matter migrates to faces of the trench where it eventually plugs the pore spaces and essentially stops the movement of water into the soil. At this point septic effluent will bleed onto the surface of the ground, exposing the environment to untreated septic effluent and the high populations of bacteria and virus that exist therein.

Removing the organic matter has proven to be nearly impossible, without either resting the system for up to one year or replacing it with new trenches, or both. Resting the system requires either pumping the effluent continually, and removing the effluent from the property or installing new trenches into which the effluent is discharged for the duration of the resting cycle. Both options are expensive. Additionally, replacing the trenches has the identical limitation as that of the original trenches, they work until they become plugged with organic matter. State of the art at present is the replacement of an entire set of trenches and requires the availability of land of suitable topography and soil type and an area equal to the original system. Usually an area about 100 feet by 150 feet for a four bedroom home. Many times there simply is no replacement area due to topography, soil type or the size of the original land purchased. In this case, state of the art is off lot discharge after varying amounts of treatment of the effluent. This practice has severe limitations in more densely populated areas. Additionally, with this off-lot discharge practice, it has been found that a large percentage of home owners either do not repair the treatment systems or even shut them off when the cost of operation is realized. This can add significantly to pollution levels of surface water supplies.

A septic leach trench system which has been properly sized for soil type and has no restriction due to mechanically induced compaction, experiences an occasional flood of effluent, which is usually followed by a sufficient period of time for the effluent to leach out of the trench and establish an aerobic community of bacteria which reduce organic matter to carbon dioxide and water with some mineral residue. Complete digestion of organic matter results in an absence of material that might plug the pore space of the soil and slow or even stop water movement.

A method of restoring soil porosity and soil aeration to soils adjacent septic leach trenches is proposed. This method restores the original soil porosity and improves drainage of liquids from the trenches, encourages aeration and improves microbial degradation of accumulating organic matter. Benefits to be obtained are: reduction in the accumulation of organic matter and the decomposition of existing accumulations of organic matter thus unplugging the soil pore spaces within the soil. Unplugged pore spaces allow liquid to leach downward into the soil. This method of restoring soil porosity and soil aeration eliminates the need to replace failed leach trenches and will stop surface pollution of treated systems.

SUMMARY OF THE INVENTION

The present invention provides for a method of modifying the soil porosity and permeability of leach trench septic systems comprising the following steps: pumping water out of a septic trench of a septic system; sufficiently drying out soil located adjacent the septic trench; loosening the soil at a depth of approximately 18 inches in close proximity to a septic trench wall; loosening the soil to a depth of approximately 18 inches in line with wheels of a vehicle pulling a tillage tool; lifting the loosened soil upward approximately 5 to 6 inches;

drawing air into the soil; allowing the soil to fall and fracture; and decreasing bulk density of the soil.

The various features and advantages of the invention will become more apparent from the detailed description of a preferred embodiment of the invention when considered along with the accompanying drawings.

BEST MODE FOR CARRYING OUT THE INVENTION

Figure 1:
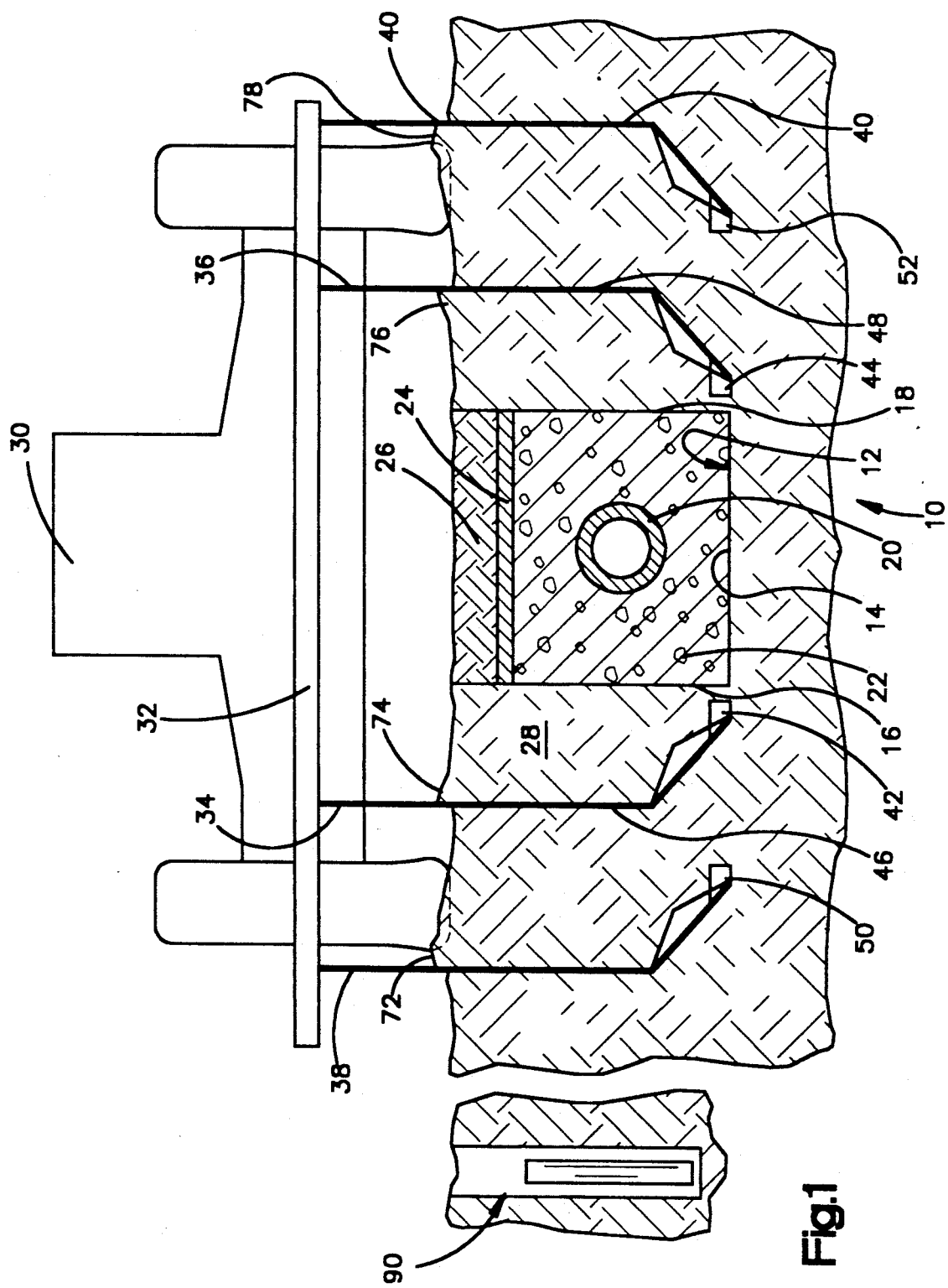
FIG. 1 is a diagrammatic sectional view of a septic trench and surrounding earth and apparatus for modifying soil.

In the ground 10 is located a conventional septic leach trench 12 as part of a septic system. The septic trench 12, having a bottom wall 14 and two side walls 16, 18, is approximately 18 inches deep and 18 inches wide. The septic trench comprises a pipe 20, gravel 22, straw 24 and a layer of top soil 26. The pipe 20 can be constructed of numerous materials, e.g., plastic and ceramic materials. A ceramic pipe 20 consists of numerous individual pipes lined up in series end to end with gaps between each individual pipe for effluent to laterally flow into the septic trench 12. A plastic pipe is constructed of a continuous perforated length of plastic. The perforations are essential for the effluent to pass out of the pipe and into the septic or leach trench 12. The pipe is supported by approximately 6 inches of gravel in the septic trench 12. Around the pipe 20 and approximately 6 inches above the pipe is more gravel 22. The gravel is porous and, therefore, the effluent will readily flow into and through the gravel 22 to then be distributed into the subsoil 28 adjacent the septic trench 12. Straw 24 is placed on top of the gravel 22 and then a layer of top soil 26. There can be approximately 6 inches of top soil 26 above the gravel 22. Straw is used to separate the top soil from the gravel and to prevent the top soil from passing in the gravel layer.

A tractor 30 with support wheels is provided with a tool bar 32 to which is attached at least one tillage tool. In FIG. 1, there are four tillage tools 34, 36, 38, 40 attached to the tool bar 32.

Each tillage tool 34, 36, 38, 40 has a relatively vertical section that extends from above the ground 10 down to a desired depth of approximately 16 inches, i.e., partially the depth of the septic trench, and then can bend at an obtuse angle partially toward the septic trench. Another type is a tillage tool where the point is in the same vertical plane as the rest of the tool.

Tillage tools 34, 36 are located directly adjacent the septic trench. Each tillage tool is provided with a point 42, 44. The points on tillage tools 34, 36 are located approximately 1 to 2 inches from the side walls 16, 18 of the septic trench and the vertical legs 46, 48 are located approximately 5 to 6 inches from the side walls 16, 18 of the septic trench 12.

In order to prevent mechanical compaction by the wheels of the tractor 30, tillage tools 38, 40 are positioned on the tool bar 32 outer to the tillage tools 34, 36 in order that the points 50, 52 are in line with the tractor wheels.

Figure 2:
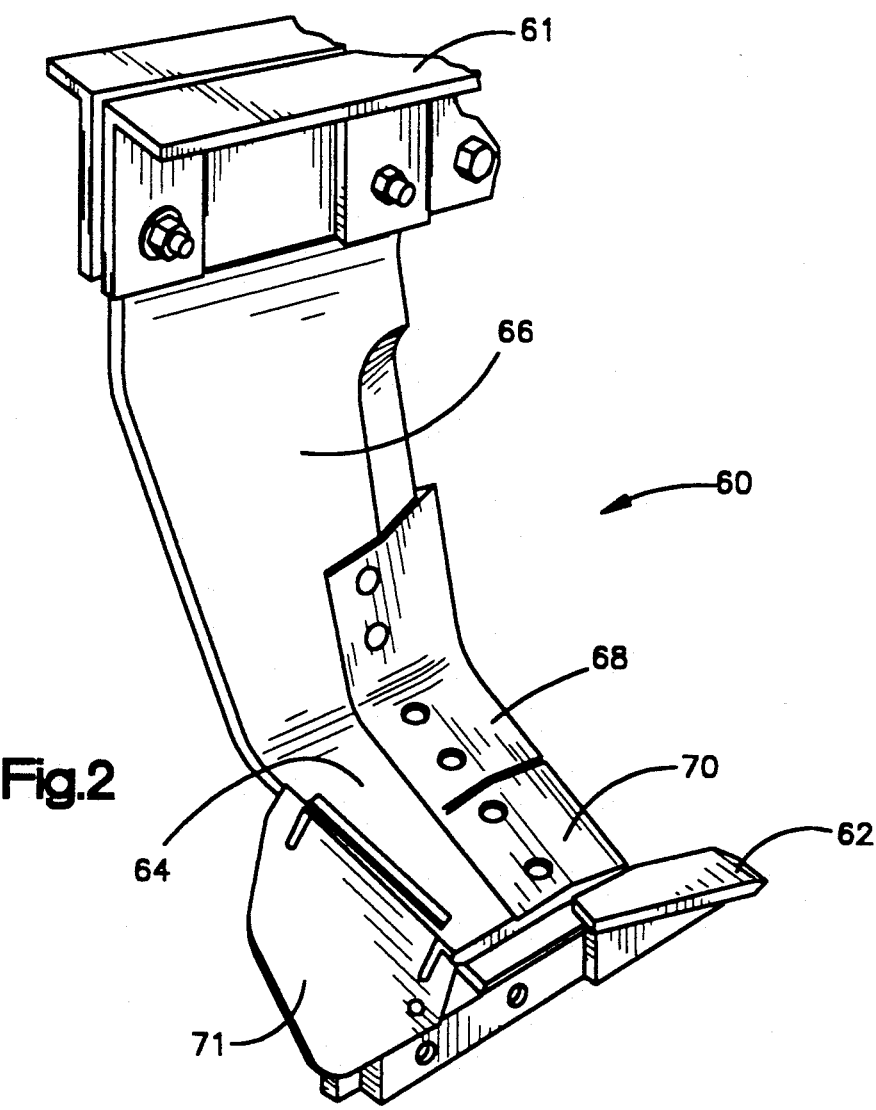
FIG. 2 is a perspective view of a tillage tool as shown in FIG. 1 for modifying the soil.
Figure 3:
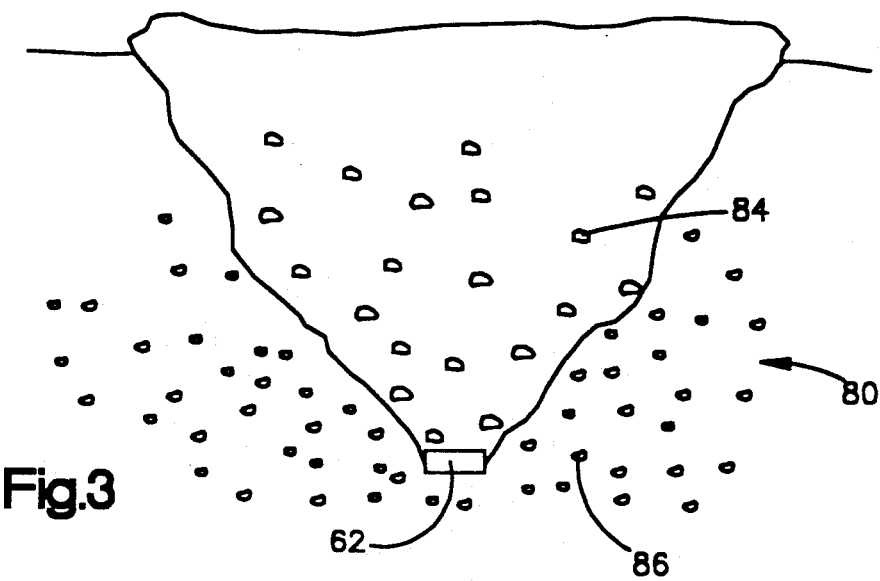
FIG. 3 is a diagrammatic sectional view of a cone of fracture created in the soil above the point of the tillage tool.

An example of a tillage tool 60, as shown in FIG. 2, is attached by a tool support 61 to the tool bar 32 and is provided with a point 62. The point is directed parallel to the side wall of a conventional leach trench 12. The action of the point at the bottom of the tillage tool is to fracture the soil above it in radial lines upward, and outward from the point. A cone of fracturing is created in the soil from the point, upward, at an angle approximating 45° from the vertical, to the left and right to the direction of travel. FIG. 3 illustrates the cone of fracture 80 created by the point 62 of the tillage tool. The soil porosity (air space) is increasing in the cone as can be seen by the reduced number of soil particles 84 in the cone as compared with the unfractured compacted soil particles 86 having diminished air spaces outside the cone. The tillage tool 60 is canted upward and outward 64 from the point 62 and then extends vertically upward so that the vertical part, leg 66, moves parallel to the side walls of the trench. The canted part 64 is also sloped front to back so that as it moves through the soil, it lifts the soil about 5 to 6 inches. The canted blade, front plates, 68, 70 moves through the soil like a wave creating a lifting and bending of soil that results in multi-directional fracturing. The force of the tillage tool is directed upward and so, as the tillage tool moves through the soil, fractures are created within the cone to the side wall of the septic trench. Shatter plate 71 exaggerates the angle at which the soil is lifted by the tillage tool moves through the soil.

The method of modifying soil permeability and aerating the soil in order to remove the mechanically-induced compaction can start with providing a curtain drain 90 parallel to the conventional leach trench if one is missing. The curtain drain intercepts the surface and internal flow of water and helps avoid the flooding of the septic system with external water. Water that has accumulated is drained out of the curtain drain. The soil is then allowed to dry a sufficient amount of time so that it will support the weight of the tractor with support wheels, tool bar, tool supports and tillage tools. Dry soil has superior load bearing characteristics than wet soil. The drying process also begins the change of bacteria in the soil, i.e., the concentration of aerobic bacteria increases.

The preferred time for performing the method of the present invention is during dry weather.

The method involves tillage tools moving parallel to the sides of the septic trench. The tillage tool moves through the soil loosening it, lifting it up about 5 to 6 inches and letting down the soil without turning the soil, unlike a plow. The tillage tool moves at a depth of approximately 18 inches. During the lifting step, air is drawn into the soil and soil porosity is increased. When the soil falls back down after having been lifted, there is an approximate 2 to 3 inch increase in the soil height depicting the increase in porosity, as shown in FIG. 1, at 72, 74, 76, 78. The tillage tools are pulled along the length of the trench and then pulled out of the soil at points adjacent the end of the trench. The soil has been fluffed. This affects bulk density of the soil. The bulk density is decreased. The change in bulk density indicates a change in the porosity of the soil. This process increases the percentage of pore spaces in the soil. While the soil is most porous, air and even wind enter the soil providing more oxygen to the soil. This enhances the concentration of aerobic bacteria and the degradation of organic matter. The enhanced degradation of the organic matter aids in keeping the soil porous as opposed to plugged. A porous soil allows the fluid to flow laterally at a maximum rate from the septic trench into the soil.

This method breaks up the artificial barrier at the surfaces of the trench in the old systems caused by mechanically induced compaction and by organic matter creating a slicking along the surface, that seals the surface, and it also includes avoiding the creation of such slicking or sealing, in new systems by assuring that the walls are porous initially and not slicked over or sealed by the pressures and compacting of the installation process.

After the soil has been modified in failed leach trench septic systems by the present invention, the septic system is continually pumped for 1 to 2 months in order to maintain the aerobic condition necessary to decompose the accumulated organic matter as rapidly as possible.

From the foregoing description of preferred embodiments of the invention, it will be apparent that the advantages of the invention heretofore enumerated and others have been accomplished. While the preferred embodiment of the invention has been described in considerable details, various modifications or alterations may be made therein without departing from the spirit or scope of the invention set forth in the appended claims.

I claim:

1. A method of modifying soil porosity and permeability of septic systems comprising the steps of: pumping water out of a septic trench of a septic system, allowing the soil to dry, loosening the soil at about a depth of 18 inches between about 1 and 2 inches from a side of the septic trench, and lifting the loosened soil about 5 to 6 inches and fracturing the lifted soil.

2. A method as set forth in claim 1 further including the step of providing a curtain drain parallel to and up slope from the leach trench.

3. A method as set forth in claim 1 further including the steps of loosening the soil at about a depth of 18 inches approximately in line with wheels of a vehicle pulling a soil tillage tool and lifting the loosened soil about 5 to 6 inches.

4. A method of soil aeration for septic systems comprising the steps of: pumping water out of a leach trench of a septic system, sufficiently drying out soil located adjacent the leach trench, loosening the soil at a depth of approximately 18 inches in close proximity to the leach trench wall, loosening the soil to a depth of approximately 18 inches in line with wheels of a vehicle pulling a tillage tool, lifting the loosened soil upward approximately 5 to 6 inches, drawing air into the soil, fracturing the soil, and decreasing bulk density of the soil.

5. A method of improving the functioning of a septic system by decreasing the bulk density of soil adjacent a wall of a leach trench of the system, including the steps of loosening soil at about a depth of 18 inches and at a distance of between about 1 and 2 inches outward from the leach trench wall and lifting the loosened soil about 5 to 6 inches and fracturing the lifted soil.

6. A method of decreasing the bulk density of soil as set forth in claim 5 further including the steps of pumping water out of the leach trench of the septic system and allowing the soil to dry.

7. A method of modifying soil permeability for septic systems having a leach trench, said trench including a wall, comprising the steps of loosening the soil at a depth of approximately 18 inches in close proximity to the leach trench wall, lifting the soil upward approximately 5 to 6 inches, fracturing the soil and breaking up the trench wall.

8. A method of modifying the soil permeability as set forth in claim 7 further including the step of pumping water out of the leach trench.

9. A method of modifying the soil permeability as set forth in claim 7 further including the step of allowing the soil to dry.

10. A method of modifying the soil permeability as set forth in claim 7 further including the steps of loosening the soil at a depth of approximately 18 inches in line with wheels of a vehicle pulling a tillage tool and lifting the loosened soil upward approximately 5 to 6 inches.

11. The method of improving the functioning of a septic system as set forth in claim 5 wherein the soil is loosened and lifted by pulling a tillage tool through the soil adjacent the wall of the leach trench with a wheeled vehicle and aligning the tillage tool with a wheel of the vehicle in the direction the tool is pulled.

12. A method of improving the functioning of a septic system by decreasing the bulk density of soil adjacent a wall of a leach trench of the system at a depth substantially equal to the depth of the leach trench and outwardly adjacent the leach trench wall by lifting and fracturing the soil near the leach trench wall.

13. A method of improving the functioning of a septic system as set forth in claim 12 further comprising the steps of pumping water out of the leach trench of the system and allowing the soil adjacent the system to dry.

14. The method of improving the functioning of a septic system as set forth in claim 12 wherein the soil is loosened, lifted and fractured by pulling a tillage tool through the soil adjacent the wall of a leach trench with a wheeled vehicle and aligning the tillage tool with a wheel of the vehicle in the direction the tool is pulled.

* * * * *